April 12, 1949.  J. A. FAVRE  2,467,200
SHOCK RESPONSIVE MECHANISM
Filed Feb. 7, 1948
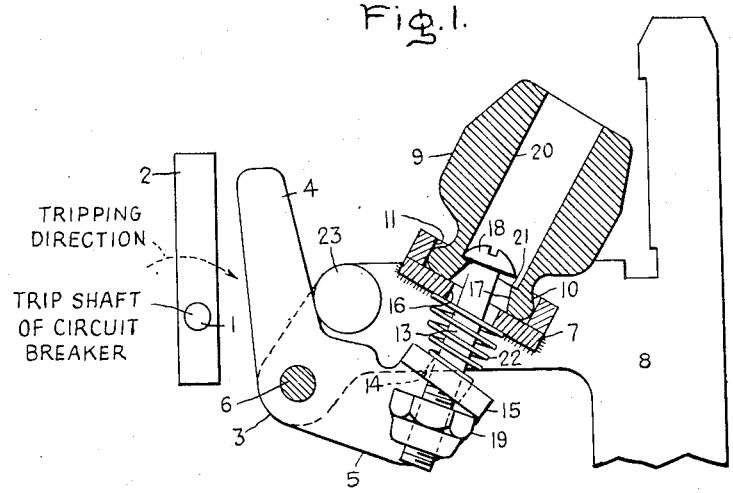
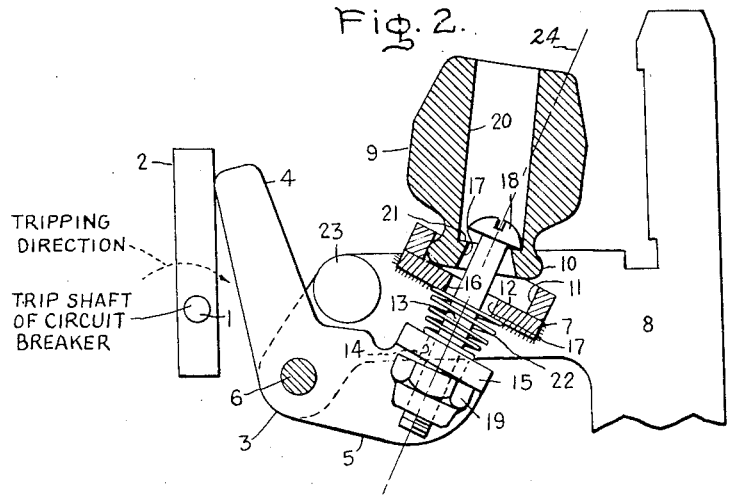
Inventor:
John A. Favre,
by Ernest C. Britton
His Attorney.

Patented Apr. 12, 1949

2,467,200

UNITED STATES PATENT OFFICE 2,467,200

SHOCK RESPONSIVE MECHANISM

John A. Favre, Drexel Hill, Pa., assignor to General Electric Company, a corporation of New York Application February 7, 1948, Serial No. 6,869

6 Claims. (Cl. 74—527)

My invention relates to improvements in shock responsive mechanisms and more particularly to mechanisms for preventing the false operation of devices in consequence of shocks without interfering with the intended operation of the devices longer than the duration of the shock.

Devices such as circuit breakers, relays and the like, which are intended to function under abnormal conditions of an electric circuit, are liable to operate falsely under shock conditions. On board warcraft, especially in time of battle, such shock produced false operations could prove extremely crucial by effecting the deenergization of motors and other apparatus so critically needed in operation. In order to prevent such false operations, various arrangements have been proposed and many actually used. Many of these arrangements materially interfere with or actually prevent the intended fault responsive operation of the devices since they either render the devices less sensitive in their fault responsive action or leave the devices indefinitely locked against operation. Other arrangements which do not materially interfere with the intended operation of the devices are either too dependent on the human element or else too complicated to apply to existing circuit breaker and relay structures.

An object of my invention is to provide for devices, and particularly protective devices such as circuit breakers, relays and the like, an improved shock responsive rotary pendulum mechanism for preventing false operation of the devices under shock conditions without interfering with the intended operation of the devices except to a limited degree during shock conditions. Another object of my invention is to provide a shock responsive mechanism involving an inverted pendulum weight mounted to have a universal conic rotary motion which functions automatically on the occurrence of a shock to prevent false operation of the device to which it is applied and which is automatically self-restoring to a central shock susceptible position upon the subsidence of the shock. A further object of my invention is to provide a relatively simple, automatic, shock responsive mechanism having a structure readily adaptable to existing protective devices such as circuit breakers, relays and the like. These and other objects of my invention will appear in more detail hereinafter.

In accordance with my invention, I provide for devices such, for example, as circuit breakers, relays and the like, for preventing the false operation thereof on the occurrence of shocks, a blocking element movable from an initial position into engagement with a part of the device to prevent a shock produced operation thereof. For effecting the preventing movement of the blocking element, I provide means comprising a support which is subject to shocks effecting the device and on which is mounted a weight for substantially universal movement relatively to the support. Between the weight and the blocking element, I provide a slip connection for permitting movement of each relatively to the other. Also in accordance with my invention, I provide yieldable force exerting means tending to maintain the weight in a predetermined shock susceptible position on the support and the blocking element in its initial position.

My invention will be better understood from the following description when considered in connection with the accompanying sheet of drawings, and its scope will be pointed out in the appended claims.

In the accompanying sheet of drawings, Fig. 1 is a vertical elevation, partly in section, of a shock responsive mechanism embodying my invention and shown in the normal or rest position; and Fig. 2 is a view similar to Fig. 1 showing the position of the parts in consequence of a shock having a force component from left to right as viewed in the drawing.

In the two figures of the drawing, I have illustrated an embodiment of my invention as applied to prevent or block the tripping action of a circuit breaker mechanism of which there is shown only the trip shaft 1 with an arm 2 rigidly secured thereto inasmuch as it will be obvious to those skilled in the art that my invention is not limited in its application to a particular circuit breaker or to circuit breakers but may be used to prevent shock produced false operation of other devices. As indicated in the drawing, the tripping direction of the trip shaft 1 is clockwise. The purpose of my invention is to prevent this tripping movement when it is induced by shocks affecting the circuit breaker.

In accordance with my invention, I prevent this shock induced false operation by a blocking element 3 which is movable from an initial position shown in Fig. 1 into engagement with the arm 2 to prevent a shock produced operation of the circuit breaker by blocking the clockwise movement of the trip shaft 1. As shown, the blocking element 3 is a bell crank having arms 4 and 5. This crank is pivotally mounted at 6 so that the arm 4 can be moved into abutting engagement with the arm 2 on the trip shaft 1 to prevent rotation of this shaft in the tripping direction.

For effecting the preventive movement of the blocking element 3, I provide, in accordance with my invention, a support 7 subject to shocks affecting the circuit breaker. As shown, the support 7 is a cup which is secured as by welding or otherwise to a base member 8. This base member is mounted so as to partake of the shocks to which the circuit breaker is subjected. Thus, the base 8 may be suitably secured to the circuit breaker frame, mounted rigidly within the circuit breaker housing or otherwise, as will be obvious to those skilled in the art.

Mounted on the cup 7 for substantially universal conic rotary movement relatively thereto is an inverted pendulum weight 9 having a base portion 10 seated in the cup in the rest position of the weight shown in Fig. 1. The weight 9 may be heavy or light depending on the amount of unbalance of the system to be blocked. The base portion 10 of the weight is so shaped as to permit angular movement of the weight relatively to the cup. Thus, in the illustrated embodiment of my invention, the inner wall 11 of the cup 7 is substantially cylindrical and the inside or bottom surface 12 of the cup is substantially flat, while the base 10 of the generally cylindrical weight 9 is narrowed down from the body and rounded along its periphery as shown.

For permitting movement of both the weight 9 and the crank 3 relatively to each other, I provide a slip or swivel connection between these parts. As shown, this connection comprises a substantially rigid member such as a rod 13 extending loosely through an opening 14 provided in a flange 15 on the arm 5 of the crank 3 and through openings 16 and 17 provided in the base of the cup 7 and in the weight 9, respectively. To prevent the escape of the rod 13 through these openings and also to determine the effective length of the end connection, end enlargements are provided on the rod in the form of a head 18 and a nut 19, the latter being threaded on the rod and preferably of the non-slip type. In order to permit the entry of the head 18 on the rod 13 into the weight 9 so that the weight cannot slip off, the weight is provided with a substantially cylindrical opening 20 somewhat larger in diameter than the maximum diameter of the head 18. Also, the relative size of the openings 20 and 17 where they meet is such as to provide a retaining shoulder 21 for engagement with the head 18.

For maintaining the inverted pendulum weight 9 in a predetermined central shock susceptible position in the cup 7 and yet permitting the desired movements of the weight 9 and the crank 3 relatively to each other, I provide yieldable force exerting means such as a resilient member 22. As shown, this member is a compression spring positioned around the rod 13 between the lower side of the cup 7 and the upper side of the flange 15 on the arm of the crank 3. This spring tends to maintain the weight 9 in its normal or rest position and the blocking element or crank 3 in its initial position, all as shown in Fig. 1, so that under normal conditions, that is, no shock, there is no interference whatever with the trip shaft 1. Consequently, there is no interference whatever with the sensitivity of the setting of the circuit breaker trip devices. Inasmuch as the restraining force on the arm 2 is largely dependent on the severity of the shock, a simultaneous fault will in many cases produce sufficient line disturbance for the coincident tripping forces of the overload devices to overcome the shock lock restraint and trip the circuit breaker without waiting for the oscillations of the weight to subside.

A body free to rotate, even though supported by a pin at its center of gravity, tends to turn when vibrated. If such a body is definitely positioned by some projection bearing against a fixed pin, any impact on the supporting structure will be transmitted to the body through both the supporting pin and the positioning pin. This impact through the fixed pin will produce higher angular acceleration if the positioning pin is rigid. This occurs even though the direction of shock is at right angles to the plane of rotation. Accordingly, although the effective length of the rod 13 between its head 18 and the nut 19 determines the initial or off position of the crank 3, I preferably provide a stop 23 which is positioned on the base 8 for engagement by the arm 4 of the crank upon clockwise movement thereof. In order to give the bell crank 3 the maximum initial acceleration from the impact of shocks, this back stop 23 should be made relatively rigid.

Referring now to Fig. 1 in which the parts are shown in the normal or rest position, that is, no shock, and assuming the occurrence of a shock with a force component in the direction from left to right as viewed in the drawing, then the weight 9 is caused to turn counterclockwise about a portion of the periphery of its base 10 into the position shown in Fig. 2 until the head 18 of the rod 13 engages the side of the shoulder 21 opposite to that shown in Fig. 1. This movement of the weight 9 compresses the spring 22 and raises the rod 13 generally upward thereby causing counterclockwise movement of the crank 3. This movement brings the crank arm 4 into engagement with the trip arm 2 to prevent rotation of the trip shaft 1 in the tripping direction. As long as the shock force is maintained, the blocking action thus directed is continued. While the force acting on the weight 9 in consequence of a shock causes it to move first to an offcenter position relatively to the cup 7, as shown for example in Fig. 2, the weight subsequently rolls around the inner wall 11 of the cup at about the same inclination to the plane of the bottom surface of the cup, that is, to gyrate about an axis 24 through the axial center of the rod 13. This rolling or spinning action persists until the shock vibrations subside and therefore maintains a relatively constant restraining force which contributes substantially to the successful performance of apparatus embodying my invention. Upon cessation of the shock, the spring 22 and gravity take over to restore the weight 9 to the central rest position, and the spring 22 returns the crank 3 to the initial position with the parts again positioned as shown in Fig. 1.

From the foregoing, it will be obvious that any force component of shock which tends to turn the weight about any point of the periphery of its base 10 will produce a trip blocking action in a similar manner.

While I have shown and described my invention in considerable detail, I do not desire to be limited to the exact arrangements shown, but seek to cover in the appended claims all those modifications that fall within the true spirit and scope of my invention.

What I claim as new and desire to obtain by Letters Patent of the United States is:

1. A shock responsive mechanism for preventing the false operation of a device on the occurrence of shocks comprising a blocking element movable from an initial position into engagement with a part of the device to prevent a shock produced operation thereof and means for effecting said preventive movement of the blocking element comprising a support subject to shocks affecting the device, an inverted pendulum weight mounted on said support for substantially universal conic rotary movement relatively thereto in response to shock, a swivel connection between said weight and said element for permitting rotary movement of the weight relatively to the element, and yieldable force exerting means tending to maintain said weight in a predetermined central shock susceptible position on said support and said blocking element in its initial position.

2. A shock responsive mechanism for preventing the false operation of a device on the occurrence of shocks comprising a relatively immovable cup subject to shocks affecting the device, a weight having a base portion seated in said cup in the rest position of the weight, said base portion and said cup being shaped to permit angular movement of the weight relatively to the cup, a crank positioned for angular movement from an initial position into engagement with a part of the device to prevent a shock produced operation thereof, a limited length slip connection between said weight and said crank for effecting the blocking movement of the crank upon a predetermined angular movement of the weight relatively to the cup, and yieldable force exerting means between the cup and the crank tending to maintain the weight in its rest position and the crank in its initial position.

3. A shock responsive mechanism for preventing the false operation of a device on the occurrence of shocks comprising a relatively immovable cup subject to shocks affecting the device, a weight having a base portion seated in said cup in the rest position of the weight, said base portion and said cup being shaped to permit angular movement of the weight relatively to the cup, a bell crank mounted so that upon a predetermined angular movement thereof from an initial position one arm of the crank engages a part of the device to prevent the operation thereof, a limited length slip connection between said weight and the other arm of said crank for effecting the blocking action of the crank upon a predetermined angular movement of the weight relatively to the cup, and resilient force exerting means between the cup and said other arm of the crank tending to maintain the weight in its rest position and the crank in its initial position.

4. A shock responsive mechanism for preventing the tripping of a circuit breaker on the occurrence of shocks comprising a pivotally mounted element movable in one direction from an initial position into engagement with the tripping mechanism of the circuit breaker to prevent the tripping thereof and means for effecting said blocking movement of the blocking element comprising a cup subject to shocks affecting the circuit breaker, a weight having a base mounted in said cup for substantially universal movement of the weight relatively to the cup, means for effecting the blocking movement of said element upon a predetermined angular movement of the weight relatively to the cup comprising a rigid member extending loosely through an opening provided in said element and openings provided in said support and said weight, said member being provided with end enlargements exceeding the size of said openings for determining the effective length of the member, and a compression spring between said support and said element tending to maintain the weight in a predetermined shock susceptible position and the blocking element in its initial position.

5. A shock responsive mechanism for preventing the tripping of a circuit breaker on the occurrence of shocks comprising a relatively immovable cup subject to shocks affecting the circuit breaker, a weight having a base portion seated in said cup in the rest position of the weight, said base portion and said cup being shaped to permit angular movement of the weight relatively to the cup, a bell crank mounted so that upon a predetermined angular movement thereof from an initial position one arm of the crank engages the tripping mechanism of the circuit breaker to block the tripping action thereof, a slip connection between said weight and the other arm of said crank for effecting the blocking action of the crank upon a predetermined angular movement of the weight relatively to the cup comprising a rigid member extending loosely through an opening provided in said other arm of the crank and openings provided in said cup and said weight, and enlargements on said member near the ends thereof exceeding the size of said openings for determining the effective length of said slip connection, and a compression spring around said member and between the cup and the other arm of said crank tending to maintain the weight in its rest position and the crank in its initial position.

6. A shock responsive mechanism for preventing the tripping of a circuit breaker on the occurrence of shocks comprising a relatively immovable cup subject to shocks affecting the circuit breaker, a weight having a base portion seated in said cup in the rest position of the weight, said base portion and said cup being shaped to permit angular movement of the weight relatively to the cup, a bell crank mounted so that upon a predetermined angular movement thereof from an initial position one arm of the crank engages the tripping mechanism of the circuit breaker to block the tripping action thereof, a slip connection between said weight and the other arm of said crank for effecting the blocking action of the crank upon a predetermined angular movement of the weight relatively to the cup comprising a rigid member extending loosely through an opening provided in said other arm of the crank and openings provided in said cup and said weight, and enlargements on said member near the ends thereof exceeding the size of said openings for determining the effective length of said slip connection, one of said enlargements being movable lengthwise of the member for varying the effective length of the connection, and a compression spring around said member and between the cup and the other arm of said crank tending to maintain the weight in its rest position and the crank in its initial position.

JOHN A. FAVRE.

REFERENCES CITED

The following references are of record in the file of this patent:

UNITED STATES PATENTS

| Number | Name | Date |
| --- | --- | --- |
| 2,158,753 | Hansen | May 16, 1939 |
| 2,306,974 | Oestermeyer | Dec. 29, 1942 |
| 2,409,115 | Ellis | Oct. 8, 1946 |